(12) United States Patent
Topfl et al.

(10) Patent No.: US 7,716,332 B1
(45) Date of Patent: May 11, 2010

(54) SYSTEM AND METHOD FOR SERVER-BASED PREDICTIVE CACHING OF BACK-END SYSTEM DATA

(75) Inventors: Lou Topfl, Atlanta, GA (US); Jai P. Menon, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 982 days.

(21) Appl. No.: 09/886,071

(22) Filed: Jun. 20, 2001

(51) Int. Cl.
*G06F 15/173* (2006.01)

(52) U.S. Cl. ................ 709/226; 709/219; 709/223; 709/224; 709/225; 709/229

(58) Field of Classification Search ................ 709/223, 709/217, 219, 224, 225, 226, 229
See application file for complete search history.

(56) References Cited

U.S. PATENT DOCUMENTS

| | | | |
|---|---|---|---|
| 5,369,570 A | 11/1994 | Parad | |
| 5,521,814 A | 5/1996 | Teran et al. | |
| 5,548,506 A | 8/1996 | Srinivasan | |
| 5,572,430 A | 11/1996 | Akasaka et al. | |
| 5,664,115 A | 9/1997 | Fraser | |
| 5,727,129 A * | 3/1998 | Barrett et al. | 706/10 |
| 5,740,430 A | 4/1998 | Rosenberg et al. | |
| 5,754,939 A * | 5/1998 | Herz et al. | 455/3.04 |
| 5,774,866 A | 6/1998 | Horwitz et al. | |
| 5,799,293 A | 8/1998 | Kaepp | |
| 5,826,236 A | 10/1998 | Narimatsu et al. | |
| 5,878,223 A | 3/1999 | Becker et al. | |
| 5,881,231 A * | 3/1999 | Takagi et al. | 709/212 |
| 5,889,993 A | 3/1999 | Kroeger et al. | |
| 5,940,082 A | 8/1999 | Brinegar et al. | |

(Continued)

OTHER PUBLICATIONS

Duchamp, Dan. "Prefetching Hyperlinks". Proceedings of the 2nd USENIX Symposium on Internet Technologies & Systems, Oct. 11-14, 1999, Boulder, Colorado, USA, p. 127-138.*

(Continued)

*Primary Examiner*—Dohm Chankong
(74) *Attorney, Agent, or Firm*—Thomas, Kayden, Horstemeyer & Risley, LLP

(57) ABSTRACT

A system and method for facilitating communication between a user and a network of information items. The system includes a remote data storage device for storing the information items, wherein the information items are stored in the form of pages, and wherein the pages contain a plurality of links to other information items; a client device having a user interface program thereon, for allowing a user to interface with the network and request the information items; a server device, in communication with the client device and in communication with the remote storage device, for handling information requests from multiple clients and for storing information retrieved from the data storage devices locally in a server cache memory; a data collection module for collecting and storing successive user actions; and a probability module in communication with the data collection module for calculating a probability for the links, and for comparing the probability to a predetermined threshold value, and for retrieving the information items associated with the links from the remote data storage devices and storing the information items in the server cache memory in advance of a user request for the selected information items.

5 Claims, 4 Drawing Sheets

U.S. PATENT DOCUMENTS

| | | | |
|---|---|---|---|
| 5,983,194 | A | 11/1999 | Hogge et al. |
| 6,055,569 | A | 4/2000 | O'Brien et al. |
| 6,085,193 | A * | 7/2000 | Malkin et al. ................. 707/10 |
| 6,098,064 | A * | 8/2000 | Pirolli et al. .................... 707/2 |
| 6,115,642 | A | 9/2000 | Brown et al. |
| 6,128,701 | A | 10/2000 | Malcolm et al. |
| 6,138,104 | A | 10/2000 | Marchak et al. |
| 6,157,915 | A | 12/2000 | Bhaskaran et al. |
| 6,182,122 | B1 * | 1/2001 | Berstis ....................... 709/217 |
| 6,182,133 | B1 * | 1/2001 | Horvitz ....................... 709/223 |
| 6,230,066 | B1 | 5/2001 | Sferro et al. |
| 6,233,493 | B1 | 5/2001 | Cherneff et al. |
| 6,249,769 | B1 | 6/2001 | Ruffin et al. |
| 6,295,513 | B1 | 9/2001 | Thackston |
| 6,298,319 | B1 | 10/2001 | Heile et al. |
| 6,304,861 | B1 | 10/2001 | Ferguson |
| 6,385,641 | B1 * | 5/2002 | Jiang et al. ................. 709/203 |
| 6,415,368 | B1 * | 7/2002 | Glance et al. ................ 711/158 |
| 6,493,702 | B1 * | 12/2002 | Adar et al. ..................... 707/3 |
| 6,584,498 | B2 * | 6/2003 | Nguyen ....................... 709/219 |
| 6,591,288 | B1 * | 7/2003 | Edwards et al. ............. 709/203 |

OTHER PUBLICATIONS

U.S. Appl. No. 10/649,511, filed Aug. 26, 2003.
U.S. Appl. No. 10/649,510, filed Aug. 26, 2003.
U.S. Appl. No. 10/446,569, filed May 28, 2003.
U.S. Appl. No. 60/384,043, filed May 28, 2002.
U.S. Appl. No. 60/273,088, filed Mar. 2, 2001.
U.S. Appl. No. 10/087,733, filed Mar. 4, 2002.
U.S. Appl. No. 10/293,247, filed Nov. 12, 2002.
"Fireclick's New Blueflame 2.0 Scorches a Path to E-business Profitability," Jan. 19, 2001, printed from http://www.fireclick.com/newsroom/releases/01292001b.html.

* cited by examiner

SYSTEM AND METHOD FOR SERVER-BASED PREDICTIVE CACHING OF BACK-END SYSTEM DATA

BACKGROUND OF THE INVENTION

1. Field of Invention

The present invention relates generally to client/server networks and, more particularly, to a system and method for accelerating client access of remote information items by predicting user actions.

2. Description of the Background

Client-based software programs called "web accelerators" address the problem of file system latency by pre-fetching web pages from a server device in advance of a request from an associated client. Typically, web accelerators come in the form of a browser plug-in that can recognize the links present on the displayed web page and start to download the information they represent, in advance of a user request, into a storage area of the client computer called a memory cache. By the time the client user is finished viewing the displayed page and clicks on the next link, the information associated with that next link is already available in the client user's memory cache. Other software programs allow the web page developer to assign a probability to each link, or otherwise indicate a preference, which corresponds to the likelihood that the client user will choose that link next. Those links that the user is most likely to choose are assigned the highest probability while rarely accessed links are assigned little or no weight. Despite these innovations, users still experience significant delays when an information request causes the server to access the information from back-end systems. Back-end systems, as used herein, refer to remote systems such as data warehouse repositories or legacy systems.

A system and method is needed for reducing delays in accessing information from backend systems. The system should also have sufficient flexibility to selectively retrieve information items from the backend system. The system should also be capable of accelerating client access to back-end systems without unnecessarily consuming bandwidth between the client and server devices. Finally, the system needs to be simple to implement on a wide-scale basis without requiring upgrades to individual browsers.

SUMMARY OF THE INVENTION

The present invention is directed to a system and method for accelerating client access of remote information items by predicting user actions. According to one embodiment, the system includes a remote data storage device for storing the information items, wherein the information items are stored in the form of pages, and wherein the pages contain a plurality of links to other information items; a client device having a user interface program thereon, for allowing a user to interface with the network and request the information items; a server device, in communication with the client device and in communication with the remote storage device, for handling information requests from multiple clients and for storing information retrieved from the data storage devices locally in a server cache memory; a data collection module for collecting and storing successive user actions; and a probability module in communication with the data collection module for calculating a probability for the links, and for comparing the probability to a predetermined threshold value, and for retrieving the information items associated with the links from the remote data storage devices and storing the information items in the server cache memory in advance of a user request for the selected information items.

The system and method of the present invention may be used, for example, to accelerate client access of remote information items by predicting user actions. For example, the present invention may be used in the provision of electronic commerce services in which certain information items reside on a remote storage device, such as a legacy system. These and other benefits of the present invention will be apparent from the detailed description below.

DESCRIPTION OF THE FIGURES

For the present invention to be understood clearly and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain network architecture details and interoperability applications are not described herein. Those of ordinary skill in the art will recognize, however, that these and other elements may be desirable in a typical client/server network functionally connected to a backend system. A discussion of such elements is not provided because such elements are well known in the art and because they do not facilitate ax better understanding of the present invention.

Figure 1:
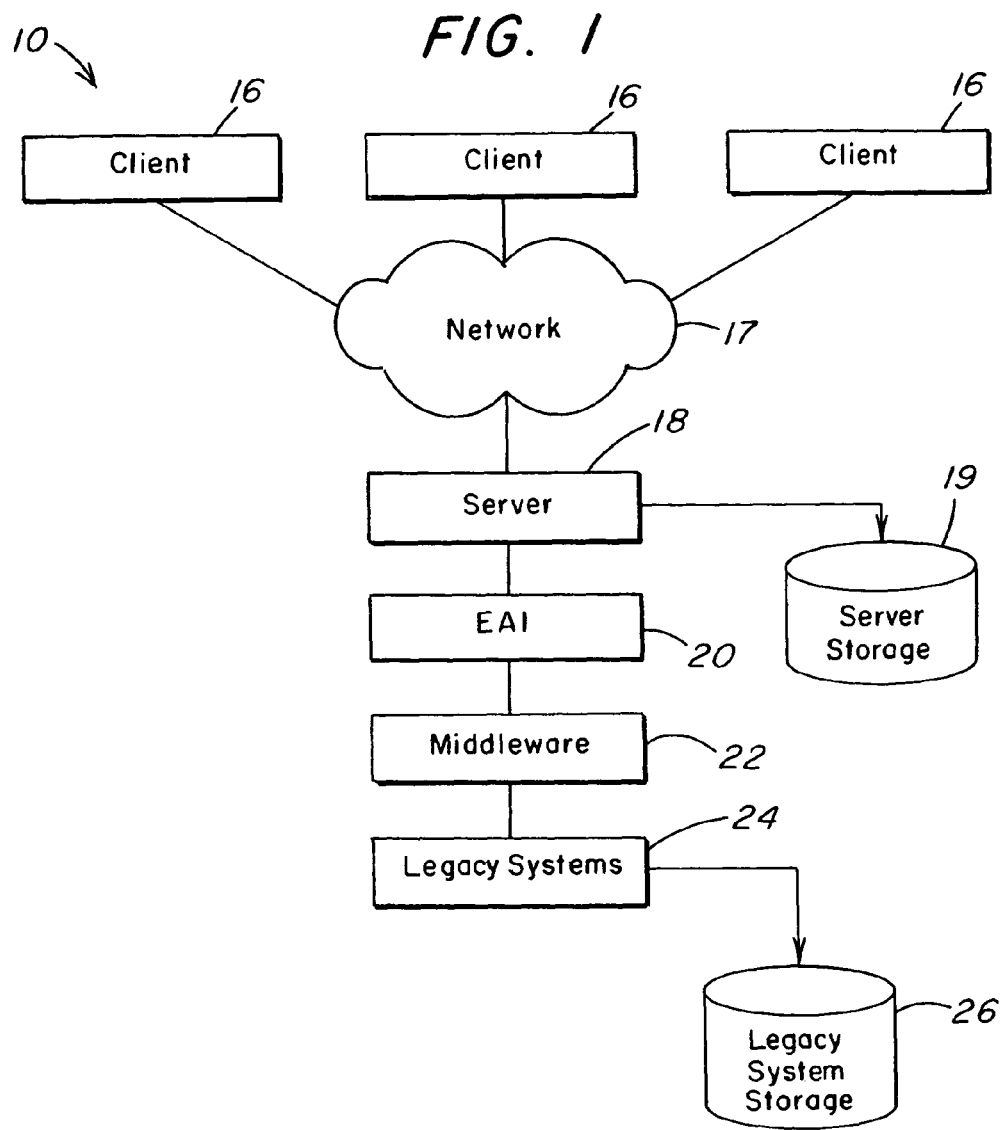
FIG. 1 is a block diagram illustrating an implementation of a high level multi-layer architecture that provides predictive file caching to address the problem of file system latency according to one embodiment of the present invention.

FIG. 1 shows an exemplary implementation of a high level multi-layer architecture that provides predictive file caching to address the problem of file system latency in a client/server network functionally connected to a backend system. In particular, FIG. 1 shows a client/server system 10 that includes at least one client device 16, a wide or local area network 17, at least one application server device 18, an enterprise application integration (EAI) application 20, a middleware application 22, a legacy system 24, and legacy data 26. According to one embodiment, the client and server devices 16, 18 are standard computer systems. Those skilled in the art will appreciate that the hardware and software interfaces between elements shown in FIG. 1 are conventional and do not form part of the invention.

A standard computer system includes a processor with standard input/output interfaces, a user interface such as a conventional keyboard and video display for accessing a central processing unit, high speed random access memory (RAM), and a physical storage device such as a fixed disk drive, upon which the operating system, application programs, and data files are stored. Those skilled in the art will appreciate that this is a simplified example of a computer and that other hardware devices and input/output connections may be present.

Figure 2:
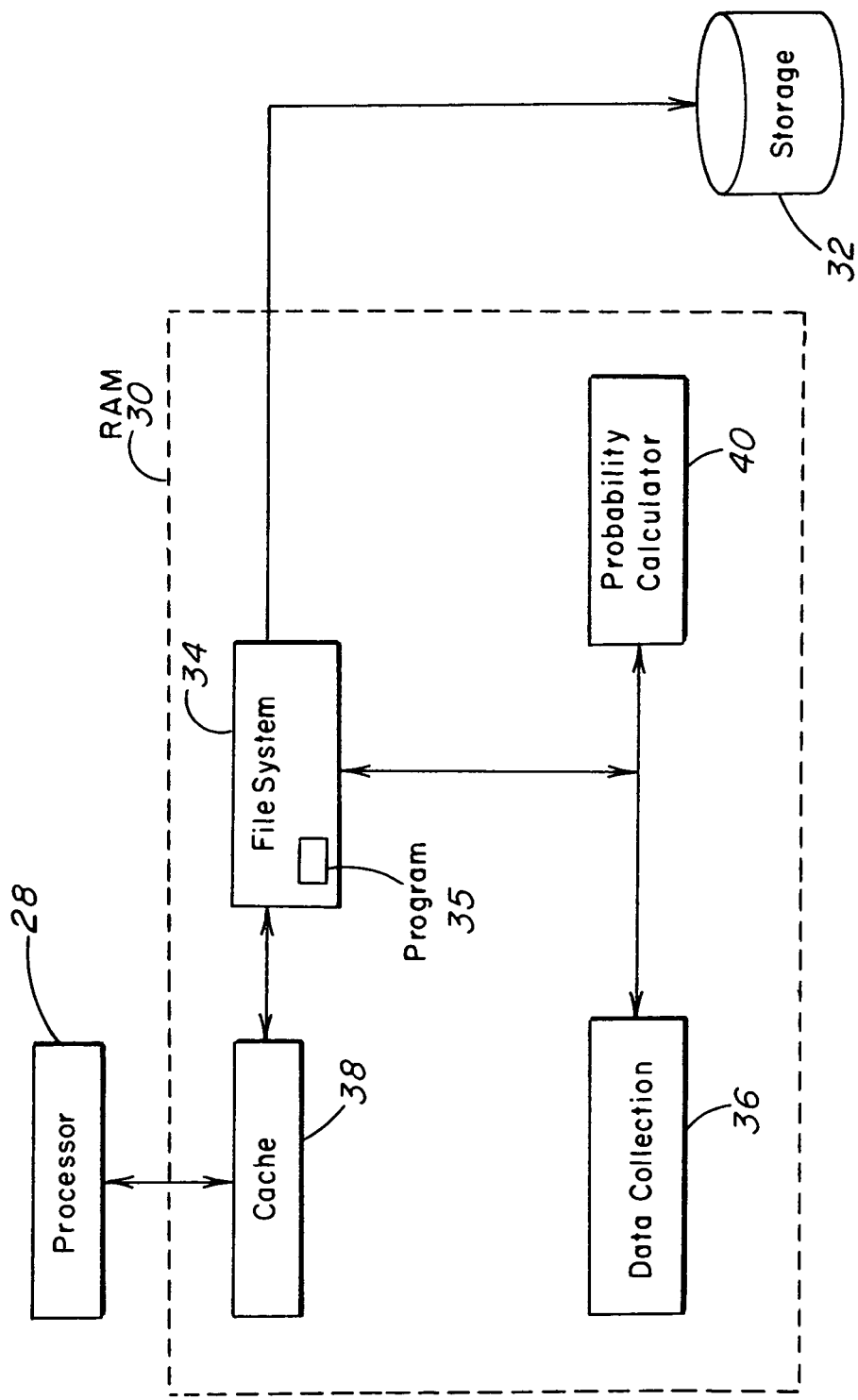
FIG. 2 is schematic diagram of a server device according to one embodiment of the present invention.

The client device 16 stores a number of computer programs, including a "browser." As known in the art, a browser is used to communicate with the remote server device 18 and to visually present the information received from such a device. The server device 18, shown in greater detail in FIG. 2, includes a processor 28 connected to RAM 30 and a physical storage device 32. The RAM 30 includes a file system 34 that stores a computer program 35 to cache files in a portion of RAM 30 shown as cache 38. It will be appreciated, however, that the invention can be implemented at any level, ranging from hardware to application software.

The enterprise application integration (EAI) and middleware applications 20, 22 are system software applications that help programs and databases work together on diverse systems. According to the embodiment illustrated in FIG. 1, the EAI and middleware applications 20, 22 integrate other applications executed on the server 18 with the data 12 stored on legacy systems 24. Those skilled in the art will appreciate that the software layers 20, 22, 24 shown in FIG. 1 are conventional and do not form part of the invention. Those skilled in the art will also appreciate that these software layers 20, 22, 24 are shown only to illustrate a cause for file system latency.

The file system 34 is supported by a data collection module 36 for tracking sequences of navigational events and a probability calculator module 40 for predicting likely future events, based on tracked sequences, and pre-fetching data for future events from remote storage 26, or disk 32, and caching the data in cache 38. The predictive caching method, therefore, can be described in terms of two principal components: (i) a data collection module 36 for tracking sequences of previous events and (ii) a probability calculator 40 for using the tracked sequences to determine likely future events and pre-fetching data for the likely future events.

Figure 3:
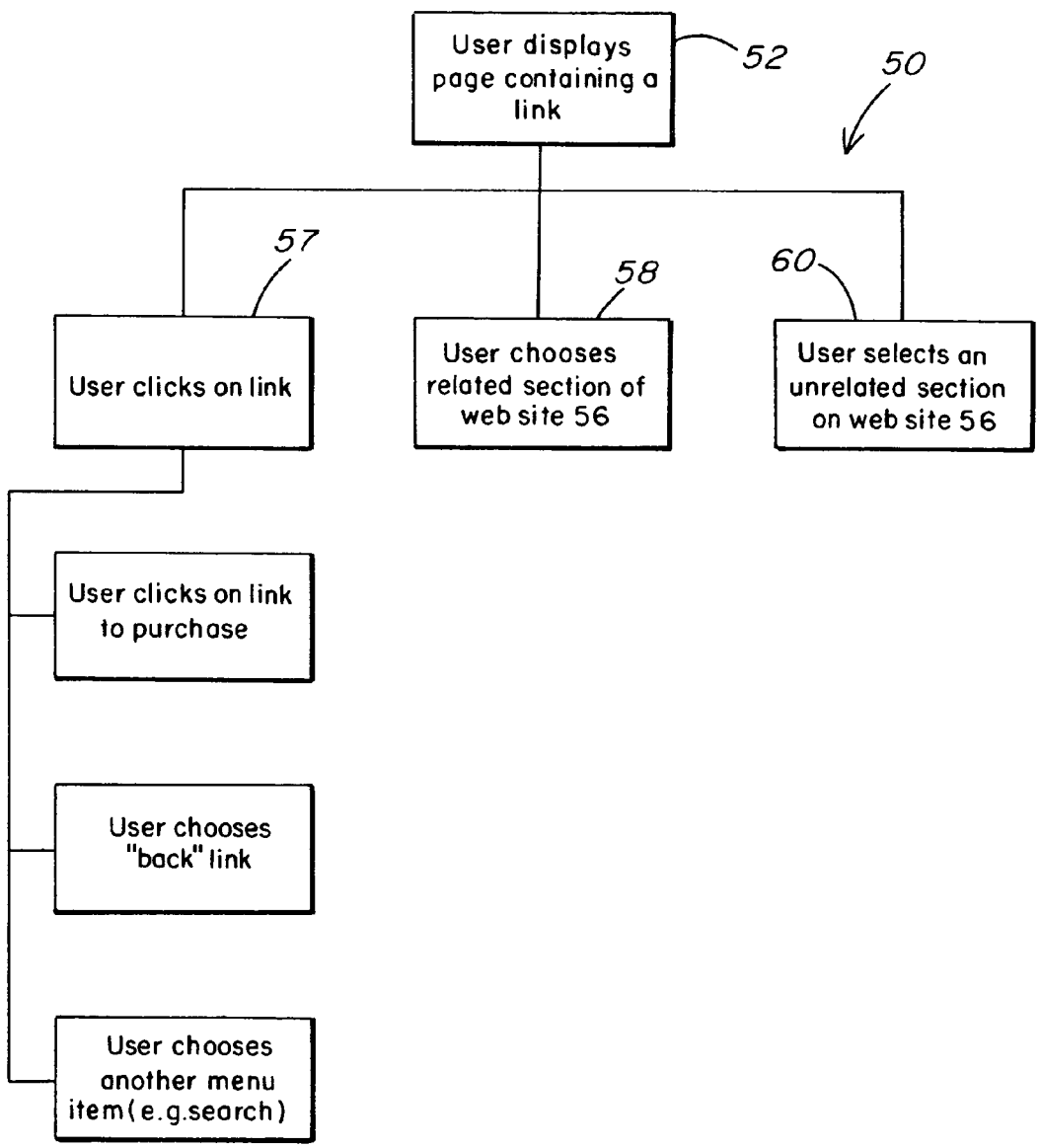
FIG. 3 is a relational diagram illustrating all possible user-selected navigational events in a web site according to one embodiment of the present invention.

The data collection module 36 collects and stores, for each web link on a given web site, the sequence of web objects selected by all users. FIG. 3 shows an exemplary relational diagram 50 that illustrates the possible user-selected navigational events with respect to a particular link 52 to a web object, which resides on a web page 54 (not shown). The web page 54, in turn, is one of a plurality of web pages that form a web site 56 (also not shown). These designations will become useful in the description of the embodiments as set forth below.

By way of example, the link 52 is a banner advertisement in which a voice and data communications provider offers a discount on an additional telephone line. The diagram 50 maps the choices 57, 58, 60 presented to a site visitor (or "user") with respect to the link 52. The user may choose to buy the second phone line by clicking on the link 52 (choice 57). Alternatively, the user may choose a link to a related section of the web site 56 (choice 58) or a link to an unrelated part of the web site 56 (choice 60). The data collection module 36 collects and stores these user actions for each link in the web site, thereby creating a comprehensive event history with respect to each link. According to another embodiment, the collection module 36 may collect and store the navigation information on a user-specific basis. For example, if a user logs onto the web site 56 using a conventional authentication procedure, the collection module 36 can attribute all subsequent navigational events to that user. When the user returns to the web site 56, the probability module 40 can make custom predictions based on the user's navigational choices during prior visits. According to another embodiment, which persons of ordinary skill in the art will appreciate, the data collection activity can take place on an ongoing basis so that the database 32 maintained by data collection module 36 is updated with each successive user activity.

The probability module 40 determines the likelihood that future users will select a given web object using the data collected and stored by the data collection module 36. For example, assume the data collection module 36 contains navigation information for 10 unauthenticated users, 3 of which chose a link to an area of the web site 56 unrelated to the link 52 (choice 60). The probability module 40 will determine that the next user has a 0.3 probability of choosing an unrelated link (choice 60). According to another embodiment, if a subsequent user chooses an unrelated link (choice 60) the data collection module 36 updates its event history and the probability module 40 updates the probability calculation. According to this example, the probability module 40 will update the probability that the next user will choose an unrelated site to approximately 0.36 (4 of 11 users). The probability module will also update probabilities assigned to the other two choices 56, 58 in the same manner so that the sum of the three probabilities equals one.

The probability module 40 also compares the probability to a pre-determined threshold value to determine whether the linked information item should be downloaded. For example, the probability module 40 may include a rules engine that contains a plurality of business rules for establishing the threshold. The business rules may consider, for example, the level of risk of retrieving data that may not be used. The level of risk may be attributed to, for example, the hardware cost of cache memory. If the probability exceeds the pre-determined threshold, the cache 38 is augmented by pre-fetching data that are likely to be accessed. Otherwise, no data will be pre-fetched.

Figure 4:
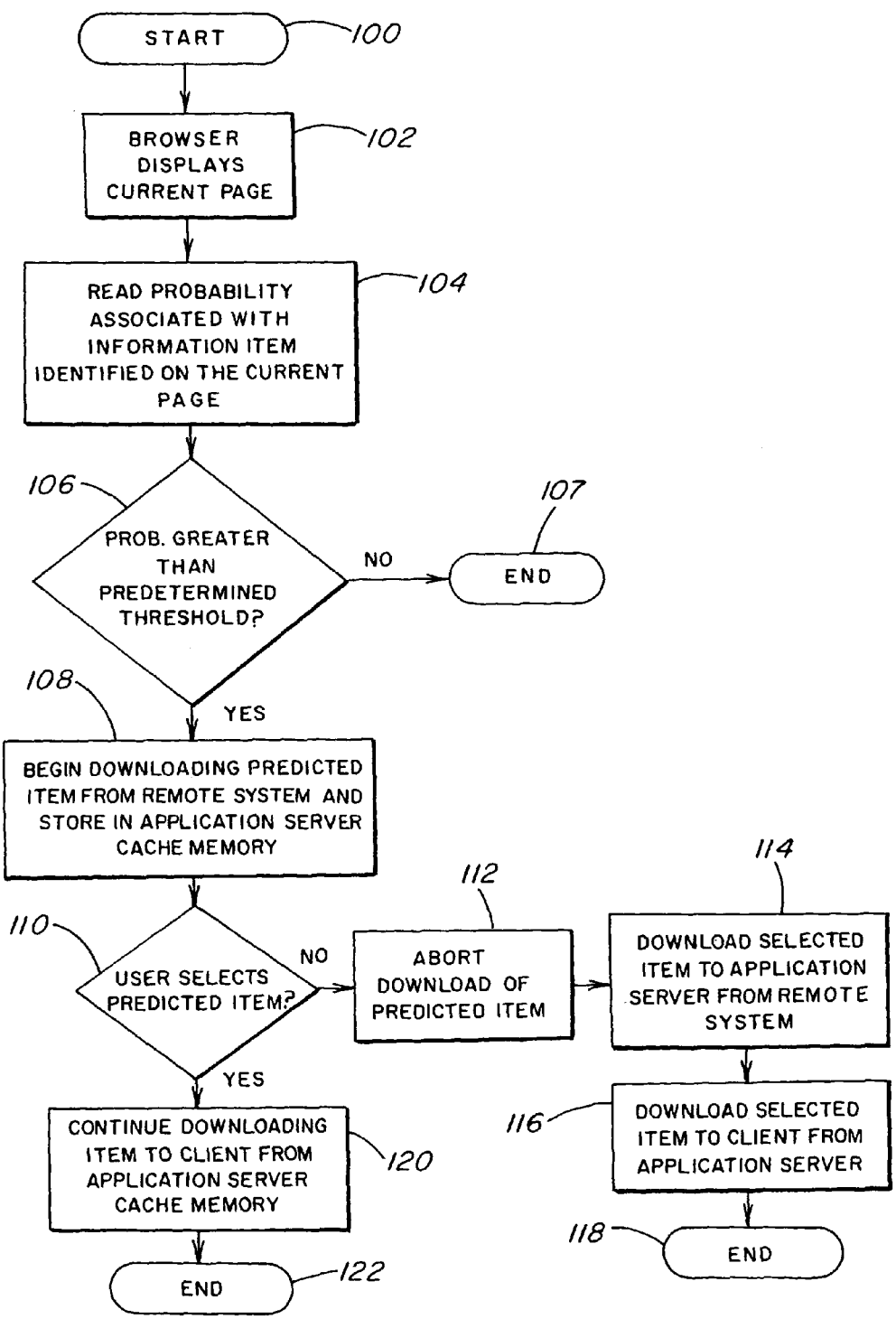
FIG. 4 is a flow diagram illustrating the general method for accelerating client access of remote information resources by predicting user actions according to one embodiment of the present invention.

FIG. 4 is a flow chart illustrating the general method for accelerating client access of remote information items by predicting user actions according to one embodiment of the present invention. FIG. 4 is entered at step 100, and in step 102, the present invention displays the web page 54 on the client device 16. In step 104, the probability associated with the link 52 on page 54 is read in a conventional manner and, in step 106, compared to the predetermined threshold value. If the probability of the user clicking on the link 52 (choice 57) is less than the threshold value, the present invention proceeds to an end in step 107.

If the probability of the user clicking on the link 52 (choice 57) is greater than the threshold value, then in step 108 the program 35 of the present invention begins to download the predicted item from remote storage 26. As explained above, the program 35 stores the predicted item in the cache 38. If the link selection determination in step 110 is incorrect, then in step 112 the present invention aborts the download of the predicted item and proceed to the end in step 107. Next, in step 114, the present invention commences a download of the selected item. If the prediction in step 110 is correct, the present invention continues to download the item in a conventional manner from the remote system 24 to the cache 38 in the application server 18.

It should be understood that the invention is not limited by the foregoing description, but embraces all such alterations, modifications, and variations in accordance with the spirit and scope of the appended claims.

What is claimed is:

1. A system for facilitating communication between a user and a network of information items, comprising:

a remote data storage device for storing the information items, wherein the information items are stored in the form of pages, and wherein the pages contain a plurality of links to other information items;

a multi-layer architecture comprising:

a client device having a user interface program thereon, for allowing a user to interface with the network and request the information items; and a server device, in communication with the client device and in communication with the remote storage device, for handling information requests from multiple clients and for storing information retrieved from the data storage devices locally in a server cache memory, the server device including at least the following:

a data collection module for collecting and storing, at the server device, successive actions of a single particular authenticated user on a user specific basis that distinguishes between specific users, the data collection module further configured to track sequences of navigational events of both the single particular authenticated user and at least one unauthenticated user; and a probability module in communication with the data collection module for calculating a first probability for the desirability of each of the links based on the action of the single particular user and for comparing each of the probabilities to a predetermined threshold value associated with business rules which factor a level of risk of retrieving data that may not be used and an associated hardware cost of cache memory to identify predicted links and for retrieving the predicted information items associated with the links from the remote data storage devices and enabling the storage of the predicted information items on both the client device layer and the server device layer of the multi-layer architecture in advance of the single particular user's request for the selected information items, the probability module including a dedicated rules engine for storing the business rules, the probability module further configured to:

update the probabilities assigned to the links with each successive user activity;

abort retrieving the predicted information items if the user requests an information item other than the predicted information items;

continue retrieving the predicted information items from the remote data storage devices and storing the predicted information items in the server cache memory if the user requests the predicted information item; and download from the server device to the client device, the user requested information item to the client from the server cache memory;

wherein the first probability is calculated based solely on the actions of the single particular user during a past navigation and not as a member of a larger set of users, wherein the probability calculation module is further configured to calculate a second probability, the second probability being based on selection data of at least one link from a plurality of users, the probability being used to determine a likelihood that another user will select the at least one link, such that in response to the probability meeting a predetermined threshold, data related to the link will be retrieved prior to the another user selecting the link.

2. A method for facilitating communication between a user and a network of information items, comprising:

providing a multi-layer architecture comprising a client device and a server device;

storing the information items on a remote data storage device, wherein the information items are stored in the form of pages, and wherein the pages contain a plurality of links to other information items;

configuring the client device having a user interface program thereon, to allow a user to interface with the network and request a download of the information items;

configuring the server device for handling information requests from multiple clients and for storing information retrieved from the data storage devices locally in server cache memory;

collecting and storing, at the server device, successive actions of an authenticated single particular user;

calculating, via a probability module that includes a rules engine, a first probability for each of the links based on the successive actions of the authenticated single particular user on a specific basis that distinguishes between specific users;

tracking sequences of navigational events of both the single particular authenticated user and at least one unauthenticated user;

comparing each of the probabilities to a predetermined threshold value that is determined from business rules, stored in the rules engine, which factor a level of risk of retrieving data that may not be used where the level of risk is restricted to an associated hardware cost of cache memory;

retrieving the information items associated with the links from the remote data storage devices;

enabling the storage of the information items on both the client device layer and the server device layer of the multi-layer architecture in advance of the single particular user's request for the selected information items;

updating the probabilities assigned to the links with each successive user activity;

retrieving the predicted information items if the user requests an information item other than the predicted information items;

retrieving the predicted information items from the remote data storage devices; and storing the predicted information items in the server cache memory if the user requests the predicted information item; and downloading, from the server device to the client device, the user requested information item to the client from the server cache memory;

wherein the first probability is calculated based solely on the actions of the single particular user during a past navigation and not as a member of a larger set of users, wherein the probability module is further configured to calculate a second probability, the second probability being based on selection data of at least one link from a plurality of users, the probability being used to determine a likelihood that another user will select the at least one link, such that in response to the probability meeting a predetermined threshold, data related to the link will be retrieved prior to the another user selecting the link.

3. A system for facilitating communication between a user and a network of information items, comprising:

means for providing a multi-layer architecture comprising a client device and a server device;

means for storing the information items on a remote data storage device, wherein the information items are stored in the form of pages, and wherein the pages contain a plurality of links to other information items;

means for configuring the client device having a user interface program thereon, to allow a user to interface with the network and request a download of the information items;

means for configuring the server device for handling information requests from multiple clients and for storing information retrieved from the data storage devices locally in server cache memory;

means for collecting and storing successive actions of an authenticated particular user;

means for calculating a first probability for each of the links based on the successive actions of the authenticated single particular user on a user specific basis that distinguishes between specific users;

means for tracking sequences of navigational events of both the single particular authenticated user and at least one unauthenticated user;

means for comparing each of the probabilities to a predetermined threshold value that is determined from business rules which factor a level of risk of retrieving data that may not be used where the level of risk is restricted to an associated hardware cost of cache memory;

means for retrieving the information items associated with the links from the remote data storage devices;

means for enabling the storage of the information items on both the client device layer and the server device layer of the multi-layer architecture in advance of the single particular user's request for the selected information items;

means for updating the probabilities assigned to the links with each successive user activity;

means for retrieving the predicted information items if the user requests an information item other than the predicted information items;

means for retrieving the predicted information items from the remote data storage devices;

means for storing the predicted information items in the server cache memory if the user requests the predicted information item; and means for downloading the user requested information item to the client from the server cache memory;

wherein the probability is calculated based solely on the actions of the single particular user during a past navigation and not as a member of a larger set of users, wherein the server device is further configured to calculate a second probability, the second probability being based on selection data of at least one link from a plurality of users, the probability being used to determine a likelihood that another user will select the at least one link, such that in response to the probability meeting a predetermined threshold, data related to the link will be retrieved prior to the another user selecting the link.

4. A first network for facilitating communication between a user and a network of information items, comprising:

a remote data storage device for storing the information items, wherein the information items are stored in the form of pages, and wherein the pages contain a plurality of links to other information items;

a multi-layer architecture comprising:

a client device having a user interface program thereon, for allowing a user to interface with the network and request a download of the information items;

a server device, in communication with the client device and in communication with the remote storage device, for handling information requests from multiple clients and for storing information retrieved from the data storage devices locally in server cache memory; and the first network;

a data collection module for collecting and storing, at the server device, successive actions of an authenticated single particular user on a user specific basis that distinguishes between specific users, the data collection module further configured to track sequences of navigational events of both the single particular authenticated user and at least one unauthenticated user; and a probability module in communication with the data collection module for calculating a probability for each of the links based on the successive actions of the authenticated single particular user, and for comparing each of the probabilities to a predetermined threshold value that is determined from business rules which factor a level of risk of retrieving data that may not be used where the level of risk is restricted to an associated hardware cost of cache memory, and for retrieving the information items associated with the links from the remote data storage devices and enabling the storage of the information items on both the client device layer and the server device layer of the multi-layer architecture in advance of the single particular user's request for the selected information items, the probability module including a rules engine for storing the business rules, wherein the probability module updates the probabilities assigned to the links with each successive user activity;

wherein the probability module aborts retrieving the predicted information items if the user requests an information item other than the predicted information items;

wherein the probability module continues retrieving the predicted information items from the remote data storage devices and storing the predicted information items in the server cache memory if the user requests the predicted information item; and wherein the probability module downloads the user requested information item to the client from the server cache memory;

wherein the probability is calculated based solely on the actions of the single particular user during a past navigation and not as a member of a larger set of users, wherein the probability module is further configured to calculate a second probability, the second probability being based on selection data of at least one link from a plurality of users, the probability being used to determine a likelihood that another user will select the at least one link, such that in response to the probability meeting a predetermined threshold, data related to the link will be retrieved prior to the another user selecting the link.

5. The system of claim 1, wherein the server device is remote from the client device.

* * * * *